United States Patent [19]

Butts, Jr. et al.

[11] Patent Number: 4,709,580
[45] Date of Patent: Dec. 1, 1987

[54] RETROFLECTIVE ATTITUDE DETERMINING SYSTEM

[75] Inventors: J. James Butts, Jr., Rolling Hills Estates; Don R. Howard, Palos Verdes Estates, both of Calif.

[73] Assignee: bd Systems, Inc., Torrance, Calif.

[21] Appl. No.: 834,213

[22] Filed: Feb. 26, 1986

[51] Int. Cl.$^4$ ............................................. G01C 21/00
[52] U.S. Cl. ............................. 73/178 R; 244/158 R; 250/231 SE
[58] Field of Search ................... 250/231 SE; 73/187, 73/185, 189, 178 R; 244/158 R

[56] References Cited

U.S. PATENT DOCUMENTS

| | | | |
|---|---|---|---|
| 4,348,939 | 9/1982 | Hipp | 250/231 SE |
| 4,427,882 | 1/1984 | Nakaoki et al. | 250/231 SE |
| 4,446,729 | 5/1984 | Watson, III | 73/178 R |
| 4,500,870 | 2/1985 | Krohn et al. | 250/231 SE |

Primary Examiner—Donald O. Woodiel
Attorney, Agent, or Firm—Poms, Smith, Lande & Rose

[57] ABSTRACT

A retroreflective attitude marker includes at least two intersecting reflecting planes oriented at 90 degrees with respect to one another, and having the property that incident laser beams which are perpendicular to the line of intersection of the two planes are reflected directly back to the laser source. Each retroreflective attitude marker therefore has a single retroreflecting plane perpendicular to line of intersection of the two mutually perpendicular planes. Using three layer illuminator/receivers, directed toward a spinning object, on which a retroreflective attitude marker is located, the rate of spin and the orientation of the spin axis of the object on which the retroreflective marker is located, may be determined mathematically. Thus, with one or more of the retroreflecting devices located on the object being tracked, each of the available retroreflecting planes sweeps around through space, and when it is coincident with one or more of the laser illuminator/receivers, a reflected pulse is received at that receiver. The time intervals between these received reflections, together with similar information from one or more additional illuminator/receivers, provides adequate data for determination of the attitude and spin rate of the object under consideration.

20 Claims, 5 Drawing Figures

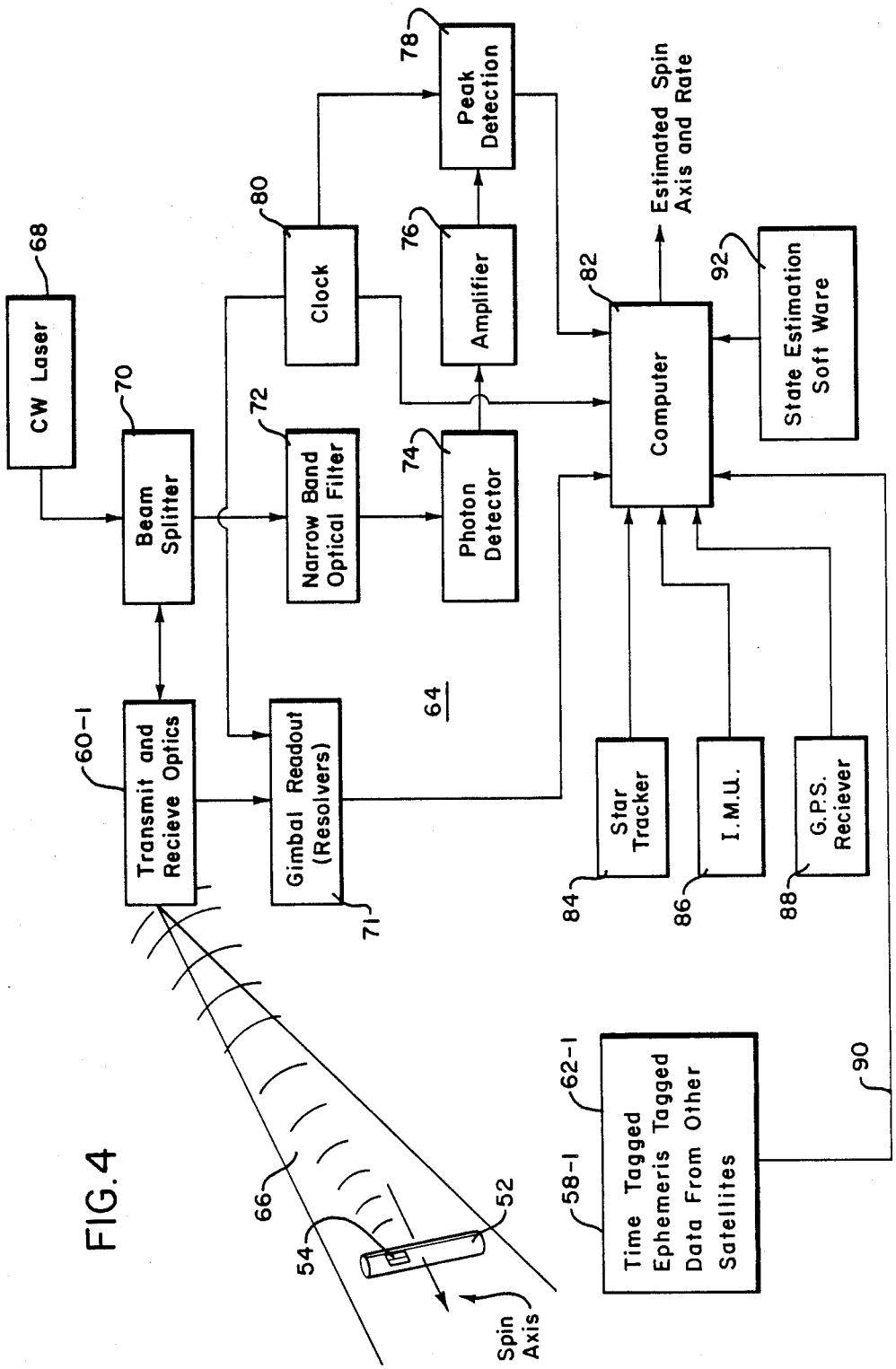

RETROFLECTIVE ATTITUDE DETERMINING SYSTEM

FIELD OF THE INVENTION

This invention relates to systems for determining the attitude and rate of rotation of moving objects.

BACKGROUND OF THE INVENTION

When a satellite, for example, becomes disabled, it may rotate or spin in space as it is orbiting the earth. Under these conditions, it is useful to determine the attitude and spin rate of the satellite, to permit the possible actuation of control jets, for example, to stabilize the satellite, or to permit its recovery.

Accordingly, a principal object of the present invention is to determine the attitude and the spin rate of objects, such as satellites or the like which are at least partially disabled.

SUMMARY OF THE INVENTION

In accordance with the present invention, an object such as a satellite is provided with at least one retroreflective attitude marker, having a predetermined plane of retroreflection. One or more laser illuminator/receivers are directed toward the satellite and the timing of retroreflective pulses is determined.

In one illustrative system, a single retroreflective attitude marker is mounted on the object, such as a satellite, and three spaced laser illuminator/receivers are directed toward the spinning object or satellite, and the reflections from the retroreflector attitude marker are timed, at each of the three receivers. The signals from all three receivers are routed to a single data processor which proceeds to solve the necessary equations to determine the spin axis and the rate of rotation, as well as other information relative to the attitude and movement of the object, such as a satellite, as it rotates in space. Instead of using three laser illuminator/receivers, an additional retroreflective attitude marker may be mounted on the satellite or other moving object, and only two laser illuminator/receivers are then needed in order to determine the desired information about the motion of the object or satellite.

Incidentally, uncontrolled objects or bodies to which no torque is being applied, such as satellites, end up within a few days, spinning about the axis of greatest inertia of the body or object, due to internal friction or damping. This axis is normally calculated and known for each satellite. One retroreflective attitude marker may be mounted at a location around the satellite away from the spin axis, for example approximately 90 degrees from the spin axis, with the line of intersection of the perpendicular reflecting planes being oriented in a known direction. When a second RAM is used, it may be mounted adjacent the first one, but with a different angular orientation, such as 45 degrees displaced from the first one. With this position of the RAMS away from the spin axis, the retroreflective planes will only be operative once during each rotation of the object and not twice thus avoiding possible ambiguities.

Other objects, features, and advantages of the invention will become apparent from a consideration of the following detailed description and from the accompanying drawings.

BRIEF DESCRIPTION OF THE DRAWINGS

FIG. 4 is a block circuit diagram indicating the nature of a system required for analyzing the retroreflective signals from the rotating object, and for determining the attitude and spin of the object.

DETAILED DESCRIPTION

Figure 1:
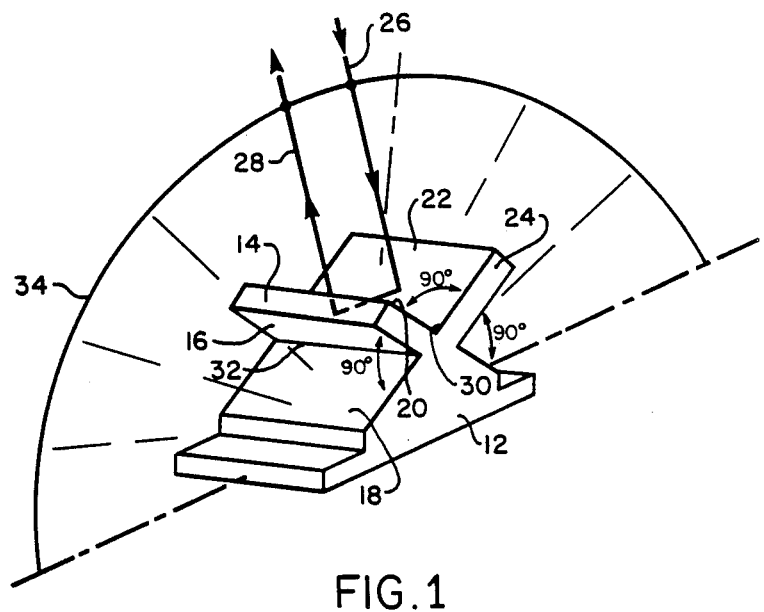
FIG. 1 is a diagrammatic showing of a retroreflective attitude marker showing the plane of retroreflection.

Referring more particularly to the drawings, FIG. 1 is a simplified schematic showing of a retroreflective attitude marker, which will from time to time be referred to hereinbelow as a "RAM" (not to be confused with a Random Access Memory, also sometimes referred to as a "RAM"). In FIG. 1, the retroreflective attitude marker 12 includes at least three pairs of mutually perpendicular faces for reflecting energy back to a laser source. Thus, for example, the upwardly extending arm 14 provides a face 16 which is located at an angle of 90 degrees with respect to the reflecting face 18 which forms a part of the base. Similarly, the other surface of the upwardly extending arm 14 includes a face 20 which is oriented at 90 degrees with respect to the face 22 which is on the other upwardly extending arm 24 of the retroreflective marker 12. To indicate the mode of operation of the retroreflective marker 12, note the incoming ray 26, which impinges on the surface 22, is reflected to the surface 20 which is oriented 90 degrees from the plane 22, and is reflected back along line 28 in exactly the direction of the incoming ray 26.

It may also be noted that the two planes 20 and 22 intersect along a line 30, which is precisely parallel to the line 32 forming the intersection between the planes 16 and 18. The curve 34 indicates a plane of retroreflection which is perpendicular to the two lines 30 and 32, representing the intersection of the retroreflection planes. Thus, if the incoming rays are precisely perpendicular to lines 30 and 32, then they are reflected back toward their source; however, if they are at a slight angle away from perpendicularity to these lines 30 and 32, the incoming rays are outside of the plane of retroreflection designated by the line 34, and no reflection directly back to the source of illumination takes place.

Figure 2:
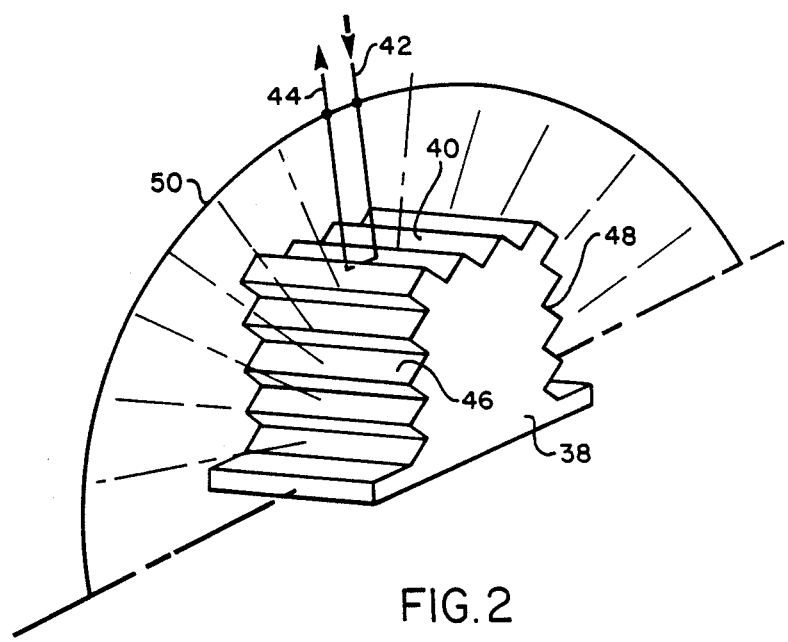
FIG. 2 is an alternative embodiment of a retroreflective attitude marker with a somewhat different geometry, as will be discussed hereinbelow.

FIG. 2 shows an alternative configuration of retroreflecting attitude marker 38. The retroreflective marker 38 has an upper serrated surface 40 including a plurality of grooves which are essentially made up of pairs of surfaces each having a 90 degree orientation relative to the immediately adjacent surface. As indicated by the incoming ray 42, and the corresponding outgoing ray 44, when incoming laser beams are perpendicular to the line of intersection of the planes making up the surface 40, there is a reflected ray which is directed immediately back in the same direction as that from which the incoming ray originated. However, when the incoming rays are at any substantial angle other than at right angles to the line of intersection of the planes making up the surface 40, there is no reflection back in the original direction. Incidentally, the two other exposed surfaces 46 and 48 of the retroreflective marker 38 are also provided with surfaces similar to those of surfaces 40 and having the same effect. The net result is a single retroreflective plane, as indicated by the line 50 having a significance similar to the line 34 of FIG. 1.

Concerning the difference in the mode of operation of the two retroreflecting attitude markers shown in FIGS. 1 and 2, the device of FIG. 1 will tend to provide a sharper and more well defined return beam, whereas that of FIG. 2 would have a somewhat broader return beam.

Figure 3:
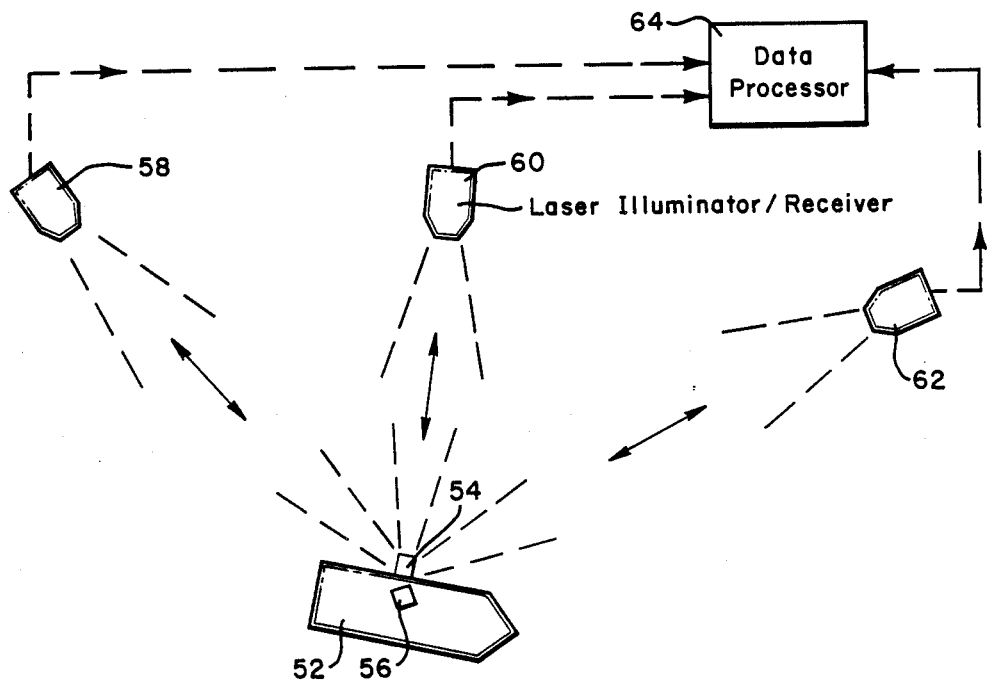
FIG. 3 shows a typical system indicating the rotating object, such as a satellite whose attitude is to be measured, and three laser illuminator/receivers.

Referring to FIG. 3, this is a block diagram indicating one overall system illustrating the present invention. More specifically, FIG. 3 shows a satellite or other rotating object 52, the rate of rotation and spin axis orientation of which are to be determined. The object 52 has at least one retroreflective attitude marker 54 mounted on its outer surface, and may have one or more additional retroreflective attitude markers 56 also mounted on its outer surface. The two retroreflective markers 54 and 56 may, for example, be of the type shown in FIGS. 1 and 2, respectively, so that the returns may be separately identified. Identification may also be accomplished by providing different polarization arrangements associated with the individual retroreflective attitude markers, so that the returns may be separately identified.

Three laser illuminator/receivers 58, 60 and 62 may be provided to direct laser beams toward the object 52, and to receive reflected radiation from the RAMS 54, 56, when the rotation of the object 52 is such that the retroreflecting planes as discussed hereinabove, direct light back toward each one of the illuminator/receivers 58, 60 and 62. A data processor 64 is provided, normally at one of the laser illuminator/receiver locations 58, 60 or 62, with information from the other two units being supplied to the data processor 64. Incidentally, the three laser illuminator/receiver units 58, 60 and 62, as well as the data processor 64 may be mounted on additional satellites which are not located in a single plane, and which are in orbit within visual sighting range of the object 52.

With reference to FIG. 4, this is a block diagram of the data processor 64 of FIG. 3. FIG. 4 shows the data processor 64 associated with the laser illuminator/receiver 60, and shows the object or satellite 52 provided with the RAM 54, and being illuminated by the laser beam 66 directed from the transmit and receive optics designated 60-1. Also shown in FIG. 4 are the CW (continuous wave) laser 68 and the beam splitter 70 coupled to the transmit and receive optics unit 60-1. The beam splitter 70 serves to direct optical energy from the CW laser 68 to the transmit and receive optics unit 60-1, and to direct return energy from the RAM 54 to the narrow band optical filter 72. The return pulses are processed by the photon detector 74, the amplifier 76, and the peak detector 78. The clock 80 provides timing for the computer 82, and gates signals from the peak detector 78 through to the computer 82 at appropriately timed intervals to facilitate use of the peak detection information by computer 82. Additional inputs to the computer 82 include the star tracker 84, providing orientation information relating to the satellite unit 60, the gimbal readout resolvers 71 indicating the orientation of the transmitted beam 66 relative to the satellite unit 60, the inertial measurement unit, or IMU 86, and the GPS receiver 88 which provides satellite location information through the Global Positioning System which is being put in place around the world. Lead 90 represents a communication link from the other two satellites 58 and 62, as shown in FIG. 3. The block designated 58-1 and 62-1 includes the legend "Time Tagged Ephemeris Tagged Data from Other Satellites". Thus, the information provided by the block designated 58-1 and 62-1 includes the location data for the two other satellites, as well as the information relating to the time of receipt of retroreflective pulses from the RAM 54. The block 92 represents the software required for performing the calculations set forth in the equations given hereinbelow in the present specification.

Figure 5:
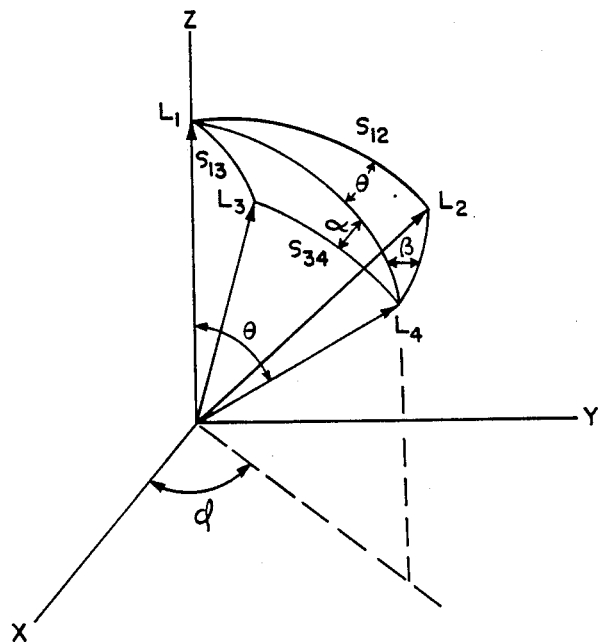
FIG. 5 is a diagram which is useful in following the mathematical analysis for determination of the attitude of the rotating object.

FIG. 5 illustrates how the attitude of a body spinning about a principal axis can be determined by use of three non-coplanar lasers. The vectors $L_1$, $L_2$, and $L_3$ define the angular position of the three lasers relative to the spinning body whose orientation is to be determined. The vector $L_4$ defines the body's spin axis direction.

If a RAM is fixed to the spinning body with the retroreflective plane containing the spin axis the spin angular rate is determined by any one of the three lasers by the measured time between successive transits, $t_{1,n} - t_{1,n-1}$, where $t_{1,j}$ is the time of the $j^{th}$ transit of the $i^{th}$ laser. The spin angular rate is given by, $$W = 2\pi/(t_{1,n} - t_{1,n-1}) \tag{1}$$

Knowing the spin rate, the two angles $\alpha$ and $\beta$ are determined by measuring the transit times:

$$\alpha = (t_{3,j} - t_{1,j}) \times W \tag{2}$$

$$\beta = (t_{1,j} - t_{2,j}) \times W \tag{3}$$

The spin axis direction (angular coordinates $\theta$ and $\phi$) are calculated via spherical trigonometry. Vector $L_1$ is chosen to be along the z axis and vector $L_2$ is chosen with complete generality to be in the xy plane. If $S_{1j}$ are the spherical triangle sides defined by the vectors $L_1$ and $L_j$ then we have, using spherical cosine rules:

$$\cos S_{12} = \cos \theta \cos S_{24} + \sin \theta \sin S_{24} \cos \beta \tag{4}$$

$$\cos S_{24} = \cos \theta \cos S_{12} + \sin \theta \sin S_{12} \cos (\pi/2 - \phi) \tag{5}$$

$$\cos S_{13} = \cos \theta \cos S_{34} + \sin \theta \sin S_{34} \cos \alpha \tag{6}$$

$$\cos S_{34} = \cos \theta \cos S_{13} + \sin \theta \sin S_{13} \cos(A - \pi/2 + \phi) \tag{7}$$

All of the $S_{1j}$ except the $S_{14}$ are knowns (defined by the laser positions). Thus we have four equations in four unknowns ($\theta$, $S_{24}$, $\phi$, $S_{34}$) which can be solved to obtain $\theta$ and $\phi$. The third attitude coordinate (the spin phase angle) is determined by retroplanar transit times; thus the orientation is completely determined.

If there are two RAMS on the object, then only two lasers are required. For example if one retroplane contains the spin axis and the other does not then the times between transit of the retroplanes will determine the angle between laser beam and spin axis ($\theta$ in FIG. 2) with an ambiguity at $\pi - \theta$. The ambiguity can be removed by amplitude modulation—making one return stronger than the other to uniquely associate transits with specific planes. Thus with $\theta$ measured by a single laser equations (4) and (5) above are sufficient to determine orientation. The third laser to measure $\alpha$ is not required. Note that there is a dead zone near the spin axis where only one plane sweeps through the laser. This can be made small to minimize the outage time.

In the above analysis it is assumed that the body is spinning about a principal axis. This case is not as special as it might seem. Torque-free bodies that are not perfectly rigid end up spinning about the axis of greatest inertia due to energy loss through internal friction or damping. This circumstance is not uncommon in disabled satellites, a prime application for the RAM. RAMs, however, can be used to determine the most general motion as will be shown below.

Let retroplanes with normal vectors $N_j$ be mounted on a rigid body. These vectors will move in a deterministic way governed by the equations of motion of a torque-free rigid body. Thus we have $$N_j = N_j(t, B_o, \phi_o, \psi_o, \dot{B}_o, \dot{\phi}_o, \dot{\psi}_o) \quad (8)$$

where the parameters to be determined are the initial conditions expressed here in terms of Euler angles (see for example Goldstein, *Classical Mechanics*). If lasers are positioned to observe transits, at the time retroplane j transits laser i located at $L_i$ the vectors $L_i$ and $N_j$ are perpendicular. Thus if different planes can be distinguished we have $$L_1 \cdot N_j(t_{1j}, B_o, \psi_o, \dot{B}_o, \dot{\phi}_o, \dot{\psi}_o) = 0 \quad (9)$$

where $t_{1j}$ is the time of transit of the $i^{th}$ laser by the $j^{th}$ plane. Six equations are needed to solve for the six unknowns. Thus we could use, for example, two planes and three lasers. We could not, however, use only one laser and six planes. This is because the dot product is invariant to a rotation about the line of sight to the laser and for example Equation 9 would not depend on $O_o$ if the laser were along the Z axis. At least two lasers are required to remove this symmetry and allow complete determination of rotational state.

However, of course, some parameters such as spin rate, could be determined using only one RAM and one laser beam and receiver.

The preferred embodiment of the invention incorporates laser sources. The invention also could be implemented with other wave sources such as microwaves, or acoustic waves in water or other media. For example, RAMs could be placed on the ocean bottom to define planes which could be detected by sonar and used for submarine navigation.

In conclusion, it is to be understood that the foregoing description and the accompanying drawings relate to one illustrative embodiment of the invention. Various departures from the precise structures and systems described hereinabove are practical in the implementation of the invention. Thus, by way of example, and not of limitation, the retroreflective attitude markers as shown in FIGS. 1 and 2 of the drawings could be replaced by a continuous semi-cylindrical member having a series of recesses in its surface, each having pairs of 90 degree oriented planes of the type shown in FIGS. 1 and 2 of the drawings. It is noted that systems using three laser illuminator/receivers and one RAM, and two illuminator/receivers and two RAMS have been discussed above. It would also be practical to obtain limited information, such as the rate of rotation of the object in space, using one illuminator/receiver and one RAM. The invention could also be implemented with other wave sources such as microwaves, or acoustic waves and sonar transmitters and receivers in water, for example. Accordingly, it is to be understood that the present invention is not limited to that shown and described hereinabove.

What is claimed is:

1. A system for determining the orientation and rate of rotation of a spinning object comprising:

means for mounting at least one retroreflective attitude marker (RAM) having a single predetermined plane of retroreflection on the object under consideration;

means for directing at least one laser beam toward said object;

means associated with said laser beam directing means for receiving laser retroreflections from said object when and only when said RAM retroreflection plane is aligned with said laser beam directing means;

means for timing the interval between the occurrence of successive received retroreflections from said RAM; and means for calculating the spin rate of said object from said successive retroflections.

2. A system as defined in claim 1 wherein the total of the number of RAMS, and of said laser beam directing and receiving means, is four, at least two of which are lasers, and means for determining the spin axis of said object from the retroreflections.

3. A system as defined in claim 1 wherein said RAM is mounted on said object at a point spaced substantially away from the normal spin axis of greatest inertia of said object, whereby ambiguities are avoided.

4. A system as defined in claim 1 wherein two RAMS are mounted on said object, and wherein said two RAMS have their retroreflective planes at different orientations.

5. A system as defined in claim 4 wherein said first and second RAMS have respectively different retroreflection characteristics.

6. A system as defined in claim 1 wherein said retroreflective marker includes a plurality of exposed pairs of reflecting surfaces, with the surfaces of each pair being mounted at ninety degrees with respect to one another.

7. A system as defined in claim 1 further including means for providing the position of the laser beam directing means, and the direction in which said laser beam is pointed.

8. A system as defined in claim 1 including a plurality of laser beam directing means and receiving means, and means for calculating the orientation of the spin axis from the retroreflections received at said receiving means.

9. A system for determining the orientation and rate of rotation of a spinning object comprising:

means for mounting at least one retroreflective attitude marker (RAM) having a single predetermined plane of retroreflection on the object under consideration, each said RAM including a plurality of exposed pairs of reflecting surfaces with the surfaces of each pair being oriented at 90 degrees with respect to one-another;

means for directing at least two radiation beams toward said object;

means associated with said radiation beam directing means for receiving retroreflections from said object when and only when said RAM retroreflection plane is aligned with said beam directing means;

means for timing the interval between the occurrence of successive received retroreflections from said RAM; and means for calculating the spin rate of said object from said successive retroflections.

10. A system as defined in claim 9 wherein the total of the number of RAMS, and of said beam directing and receiving means, is four, and means for determining the spin axis of said object from the retroreflections.

11. A system as defined in claim 9 wherein said RAM is mounted on said object at a point spaced substantially away from the normal spin axis of greatest inertia of said object, whereby ambiguities are avoided.

12. A system as defined in claim 9 wherein two RAMS are mounted on said object, and wherein said two RAMS have their retroreflective planes at different orientations.

13. A system as defined in claim 9 including a plurality of radiation beam directing means and receiving means, and means for calculating the orientation of the spin axis from the retroreflections received at said receiving means.

14. A system for determining the orientation and rate of rotation of a spinning object comprising:

means for mounting at least one retroreflective attitude marker (RAM) having a single predetermined plane of retroreflection on the object under consideration;

means for directing a plurality of laser beams toward said object;

means associated with each said laser beam directing means for receiving laser retroreflections from said object when and only when said RAM retroreflection plane is aligned with said laser beam directing means;

means for timing the interval between the occurrence of successive received retroreflections from said RAM; and means for calculating the orientation of said spin axis of said object from successive retroflections received at the plurality of receiving means.

15. A system as defined in claim 14 wherein the total of the number of RAMS, and of said laser beam directing and receiving means, is four, including at least one RAM and at least two laser means, and means for determining the spin axis of said object from the retroreflections.

16. A system as defined in claim 14 wherein said RAM is mounted on said object at a point spaced substantially away from the normal spin axis of greatest inertia of said object, whereby ambiguities are avoided.

17. A system as defined in claim 14 wherein two RAMS are mounted on said object, and wherein said two RAMS have their retroreflective planes at different orientations.

18. A system as defined in claim 17 wherein said first and second RAMS have respectively different retroreflection characteristics.

19. A system as defined in claim 14 wherein said retroreflective marker includes a plurality of exposed pairs of reflecting surfaces, with the surfaces of each pair being mounted at ninety degrees with respect to one another.

20. A system as defined in claim 14 further including means for providing the position of the laser beam directing means, and the direction in which said laser beam is pointed.

* * * * *